United States Patent
Albert et al.

(10) Patent No.: US 10,634,239 B2
(45) Date of Patent: Apr. 28, 2020

(54) PLANET CARRIER FOR SUPPORTING AT LEAST ONE PLANET WHEEL IN A PLANETARY GEAR FOR AN ADJUSTMENT UNIT FOR ADJUSTING TWO COMPONENTS ADJUSTABLE IN RELATION TO ONE ANOTHER, PLANETARY GEAR COMPRISING SUCH A PLANET CARRIER, AND MOTOR-GEAR UNIT COMPRISING SUCH A PLANETARY GEAR

(71) Applicant: IMS Gear SE & Co. KGaA, Donaueschingen (DE)

(72) Inventors: Simon Albert, Friedenweiler (DE); Matthias Kieninger, Unterkirnach (DE); Markus Kruselburger, Deisslingen (DE)

(73) Assignee: IMS Gear SE & Co. KGaA, Donaueschingen (DE)

( * ) Notice: Subject to any disclaimer, the term of this patent is extended or adjusted under 35 U.S.C. 154(b) by 0 days.

(21) Appl. No.: 16/183,387

(22) Filed: Nov. 7, 2018

(65) Prior Publication Data
US 2019/0154139 A1    May 23, 2019

(30) Foreign Application Priority Data
Nov. 17, 2017  (EP) .................................. 17202335

(51) Int. Cl.
*F16H 1/30* (2006.01)
*F16H 57/08* (2006.01)
(Continued)

(52) U.S. Cl.
CPC ............. *F16H 57/082* (2013.01); *F16H 1/30* (2013.01); *E06B 9/08* (2013.01); *E06B 9/68* (2013.01)

(58) Field of Classification Search
CPC ........ F16H 57/082; F16H 1/30; F16H 57/021; F16H 1/28; E06B 9/08; E06B 9/68; H02K 7/116
See application file for complete search history.

(56) References Cited

U.S. PATENT DOCUMENTS

| 1,276,855 A | 8/1918 | Apple |
| 5,485,761 A | 1/1996 | Rouverol |
| (Continued) | | |

FOREIGN PATENT DOCUMENTS

| CH | 707435 | 7/2017 |
| EP | 2166252 | 3/2010 |
| (Continued) | | |

OTHER PUBLICATIONS

European Patent Office, "European Search Report" issued in European Patent Application No. 17202335.0, dated May 28, 2018; document of 8 pages.

(Continued)

*Primary Examiner* — David J Hlavka
(74) *Attorney, Agent, or Firm* — Akerman LLP; Peter A. Chiabotti

(57) ABSTRACT

A planet carrier for supporting at least one planet wheel in a planetary gear for an adjustment unit for adjusting two components adjustable in relation to one another. The planet wheel comprises a planet wheel axle, which has first and second axle portions protruding beyond the planet wheel, and the planet carrier comprises a tubular main body with a passage that penetrates the main body, first and second support portions originating from the passage, where the first and second support portions are designed for the rotational accommodation of the first and the second axle portions. The planet carrier can include protrusions that fix the first and the second axle portions in the support portions.

12 Claims, 2 Drawing Sheets

(51) Int. Cl.
  *E06B 9/68* (2006.01)
  *E06B 9/08* (2006.01)

(56) References Cited

U.S. PATENT DOCUMENTS

| | | |
|---|---|---|
| 9,670,989 B2 | 6/2017 | Hagedorn et al. |
| 10,344,532 B2 | 7/2019 | Mazzoni |
| 2015/0330467 A1 | 11/2015 | Bourton |
| 2016/0160560 A1 | 6/2016 | Mazzoni |
| 2016/0297469 A1 | 10/2016 | Galehr |
| 2016/0363212 A1* | 12/2016 | Smook .................. F16H 1/28 |
| 2019/0186623 A1* | 6/2019 | Nishihira .................. F16H 1/28 |

FOREIGN PATENT DOCUMENTS

| | | |
|---|---|---|
| EP | 2860338 | 4/2015 |
| JP | H05332407 | 12/1993 |
| JP | H10-506172 | 6/1998 |
| JP | 2013-170605 | 9/2013 |
| JP | 2016-534263 | 11/2016 |
| WO | 2014/095966 | 6/2014 |
| WO | 2015/036328 | 3/2015 |

OTHER PUBLICATIONS

Korean Intellectual Property Office, "Notice of Reasons of Refusal" issued in Korean Patent Application No. 10-2018-0139296, dated Nov. 13, 2019; document of 10 pages.

* cited by examiner

PLANET CARRIER FOR SUPPORTING AT LEAST ONE PLANET WHEEL IN A PLANETARY GEAR FOR AN ADJUSTMENT UNIT FOR ADJUSTING TWO COMPONENTS ADJUSTABLE IN RELATION TO ONE ANOTHER, PLANETARY GEAR COMPRISING SUCH A PLANET CARRIER, AND MOTOR-GEAR UNIT COMPRISING SUCH A PLANETARY GEAR

CROSS-REFERENCE TO RELATED APPLICATIONS

This application claims priority to European Patent Application No. 17202335.0, filed Nov. 17, 2017, which is incorporated by reference in its entirety.

BACKGROUND

The present application relates to a planet carrier for supporting at least one planet wheel in a planetary gear for an adjustment unit for adjusting two components adjustable in relation to one another. Furthermore, the present application relates to a planetary gear which comprises such a planet carrier. In addition, the present application relates to a motor-gear assembly comprising such a planetary gear.

SUMMARY

Planetary gears are used in many drivetrains, because they enable large step-up or step-down transmission ratios in a small space. Auxiliary drives for motor vehicles, using which two vehicle parts adjustable in relation to one another can be moved relative to one another, represent one area of application. One example of such auxiliary drives are electromechanical actuator assemblies, which are used, inter alia, for actuating parking brakes of motor vehicles. Other auxiliary drives are used, for example, for seat longitudinal adjustments, tailgate adjustments, window lifters, and sliding roof adjustments. Since the available space is limited in motor vehicles, planetary gears may play out their advantages here particularly well.

Drives for windows and roller blinds of buildings are, for example, another area of application, which play a more and more important role in the course of the increasing digitization of buildings, which is referred to by the term "smart home".

In auxiliary drives, electric motors are used as the drive source almost without exception. The typically used electric motors frequently rotate at a comparatively high speed, and therefore high step-down transmissions are necessary to be able to adjust the components in relation to one another with the desired, comparatively slow movement. Moreover, the torques output by the electric motor are frequently not sufficient to be able to move the components, and therefore step-down transmissions are also required for this reason.

Although known planetary gears can provide high step-up or step-down transmission ratios, they are not sufficient in some areas of application, and therefore one is forced to use two-step or multistep gears, in which two or more planetary gears are arranged in the drivetrain. In this way, the complexity of the drivetrain is elevated, whereby in comparison to a single-step planetary gear, the manufacturing is complicated, the probability of failure is elevated, and the installation space is enlarged.

One possibility for increasing the step-up or step-down transmission ratios of planetary gears is the use of so-called "coaxial gears". The gearwheels of typical planetary gears are designed as a spur gears. In coaxial gears, the sun wheel is designed as a worm and the planet wheels are designed having correspondingly adapted planet wheel gear teeth. The ring gear has inner gear teeth corresponding to the planet wheel gear teeth.

One particularly noteworthy feature of such coaxial gears is the fact that the planet wheel axles do not extend parallel to the axis of rotation of the worm, but rather skewed thereto. At least in this regard, the term "coaxial gear" is not accurate, and therefore such gears are referred to hereafter as worm planetary gears. Such worm planetary gears are disclosed, for example, in WO 2015/036328 A1 and EP 2 166 252 A1. In addition to the high step-up or step-down transmission ratios, such worm planetary gears provide smooth running behavior with little noise development.

For the rotatable support of the planet wheels, the planet carriers can have planet wheel axles connected to the planet carriers, as known, for example, from WO 2014/095966 A1. The planet wheel axles can also be formed in one piece with the planet carriers, as described, for example, in EP 2 860 338 A2.

Such concepts for supporting the planet wheels are not suitable if the planet wheel axles are to extend skewed to the planet carrier axis. In particular, the provision of an exactly aligned planet wheel axle proves to be difficult and complex.

The object of one embodiment of the present disclosure is therefore to specify a planet carrier, which is simple to manufacture and in which the planet wheel axles may be exactly aligned and installed. Furthermore, one embodiment of the present disclosure is based on the object of providing a planetary gear, which is simple to manufacture and in which the planet wheel axles may be exactly aligned and installed. In addition, one embodiment of the present disclosure is based on the object of providing a motor-gear assembly, which comprises such a planetary gear.

This object is achieved by the features and structures recited herein. Advantageous embodiments further developments are disclosed.

One embodiment of the present disclosure relates to a planet carrier for supporting at least one planet wheel in a planetary gear for an adjustment unit for adjusting two components adjustable in relation to one another, wherein the planet wheel comprises a planet wheel axle, which has a first axle portion protruding beyond the planet wheel and a second axle portion protruding beyond the planet wheel, and the planet carrier comprises a tubular main body, which has an outer surface, at least one passage, which is arranged in the main body and penetrates it, a first support portion originating from the passage and from the outer surface, and a second support portion originating from the passage and from the outer surface, wherein the first and the second support portions are designed for the rotatable accommodation of the first and the second axle portions and the planet carrier comprises at least one fixing means for fixing the first and the second axle portions in the support portions.

The tubular main body of the planet carrier encloses an interior, in which the sun wheel is arranged in the assembled state of the planetary gear. The passage penetrating the main body enables the engagement of the planet wheels with the sun wheel. The planet wheels are therefore supported in the planet carrier in such a way that they partially protrude through the passage into the interior.

The first and the second support portions originate from the outer surface of the main body and from the passage. In other words, the support portions are formed by depressions which are arranged in the main body. Since the support portions originate from the surface of the main body and are therefore open radially outward, they may also be manufactured relatively simply, in particular also because they are well accessible from the outside. The planet carriers may also be easily installed for this reason. For this purpose, the planet wheels only have to be inserted from the outside into the support portions and fixed using the fixing means. In particular, it is possible to connect the planet wheel axis to the planet wheel before the insertion into the support portions. It is also possible to use planet wheels having integrated planet wheel axles. Planet wheels having integrated planet wheel axles can be injection-molded, for example, and therefore the planet wheels and the planet wheel axles form a one-piece component. In both cases, the modular unit consisting of the planet wheel and the planet wheel axle is finished before the insertion into the support portions. It is therefore not necessary during the assembly of the proposed planet carrier to align the planet wheel axle in relation to the planet wheel. If the planet wheel and the planet wheel axle are inserted into the planet carrier, the fixing means, which are cap-shaped, for example, can also be inserted from the outside into the support portions, whereby the planet wheel axles are fixed in the position thereof. The fixing means themselves can be fastened by means of a friction lock or by means of adhesive bonding on the planet carrier. As for the planet carriers, it also applies to the fixing means that they are easily installable because of the possibility of inserting them from the outside into the support portions. Alternatively, the fixing means can be formed by the main body, and therefore they do not represent additional components.

The components adjustable in relation to one another using the adjustment unit can be vehicle parts such as vehicle seats, tailgates, vehicle windows, or sliding roofs. The components can also be windows, blinds, or roller blinds of buildings or ships, however. The acoustic properties of the adjustment unit equipped with the proposed planet carrier differs significantly from known adjustment units, and therefore less noise development can be achieved.

According to a further embodiment, the fixing means are designed as elastically deformable projections formed by the main body, and therefore the axle portions can be clipped or are clipped into the support portions. In this embodiment, the fixing means are not formed as separate components, but rather are integrated in the main body of the planet carrier. In this way, the assembly of the planet carrier is further simplified, since the planet wheels with the planet wheel axles thereof only still have to be pressed into the support portions. The logistics of the assembly is also simplified, because the fixing means do not have to be kept ready. Separate stock keeping for the fixing means is therefore omitted. Furthermore, the projections form an undercut, whereby the load-bearing component of the support portions is elevated and the support of the planet wheels in the planet carrier is improved.

According to another embodiment, the fixing means are designed as plastically deformed projections formed by the main body. In this embodiment, the planet wheel axles are firstly laid in the support portions and subsequently the main body is deformed in such a way that plastically deformed projections are formed. The fixing means are also not formed as separate components in this embodiment, but rather are integrated into the main body of the planet carrier. Moreover, the projections also form undercuts in this embodiment, which hold the planet wheel axles in the support portions.

In a refining embodiment, the support portions can each have a delimiting surface for delimiting the axial mobility of the planet wheel. Depending on the embodiment of the fixing means, they can also delimit the axial mobility of the planet wheel, but it does not represent an additional manufacturing expenditure to provide the each of the support portions with a delimiting surface. The delimiting surface delimits the support portion within the planet carrier in such a way that the material volume which has to be removed from the tubular body to provide the support portions is also kept low. Moreover, the support portions are closed over the entire circumference. The planet carrier therefore has a comparatively high torsional rigidity.

Even if the planet wheel axle is fastened with a press fit in the planet carrier, it tends in operation to travel along the direction of the axis of rotation defined by the planet wheel axle, around which the planet wheels rotate. The delimiting surfaces are therefore used as a stop for the planet wheel axles. A certain axial play of the planet wheels is necessary to prevent, for example, jamming of the planetary gear in the event of temperature variations. This axial play may be set using the arrangement of the delimiting surfaces and the length of the planet wheel axles. The play is selected in particular in such a way that the planet wheels cannot bear against the passages, and therefore the ability of the planet wheels to rotate is not impaired.

In a refining embodiment, the tubular main body can define a planet carrier axis and the support portions can be arranged such that the planet wheel axle extends skewed to the planet carrier axis when the axle portions are accommodated in the support portions. In this case, the planetary gear is designed as a helical wheel planetary gear. In principle, the proposed planet carrier can also be used for conventional planetary gears, in which the planet wheel axles extend parallel to the planet carrier axis. The above-mentioned advantages also apply in their entirety in conventional planetary gears. In helical wheel planetary gears, in which the planet wheel axles extend skewed to the planet carrier axis, the planet carrier represents a complex component which is difficult to produce. In particular, the exact alignment of the planet wheel axles may only be implemented in manufacturing with a very large amount of effort, which complicates the manufacturing.

The additional manufacturing expenditure in the proposed planet carrier, to produce the support portions and the passage turned by the desired angle in relation to a parallel to the planet carrier axis, stays within manageable limits. The assembly of the planet carrier is not influenced or is only insignificantly influenced by the skewed alignment of the planet wheel axles in relation to the planet carrier axis.

The advantages which may be achieved using the proposed planet carrier thus come to bear in particular in helical wheel planetary gears.

In a further embodiment, the planet wheel can have planet wheel gear teeth having a crowning. In particular in coaxial gears, the crowning provides a particularly uniform engagement with the sun wheel, whereby good smooth running and low noise development may be implemented.

A refining embodiment is distinguished in that the planet wheel has planet wheel gear teeth having a profile overlap. The profile overlap also contributes to good smooth running and low noise development.

According to a further embodiment, the planet carrier consists of plastic or comprises plastic. Using plastic, the planet carrier may be manufactured particularly light, in particular in relation to a planet carrier made of metal, which results in a weight savings in the vehicle, for example.

A further embodiment is distinguished in that the planet carrier is injection-molded. The proposed planet carrier may be produced cost-effectively in large piece counts in the injection molding method. Because of the fact that the support portions are open radially outward, they may be demolded well radially, because of which the proposed planet carrier is particularly suitable for manufacturing in the injection molding method.

One embodiment of the present disclosure relates to a helical wheel planetary gear for an adjustment unit for adjusting two components adjustable in relation to one another, comprising a planet carrier according to any one of the above-described embodiments, which defines a planet carrier axis, at least one planet wheel, which is supported in the planet carrier so is rotatable about a planet wheel axle and has planet wheel gear teeth, wherein the planet wheel axle extends skewed to the planet carrier axis, a helical wheel shaft, which is supported so it is rotatable about the planet carrier axis and has helical wheel gear teeth, which are engaged with the planet wheel gear teeth, and an inner helical wheel having inner gear teeth, which are engaged with the planet wheel gear teeth.

One embodiment of the present disclosure relates to a motor-gear assembly, in particular for an adjustment unit for adjusting two components adjustable in relation to one another, comprising an electric motor and a helical wheel planetary gear according to the above-described embodiment, wherein the electric motor has a motor shaft which is connected in a rotationally-fixed manner to the helical wheel shaft.

The technical effects and advantages which may be achieved with the proposed helical wheel planetary gear and the proposed motor-gear assembly correspond to those which have been explained for the present planet carrier. In summary, it is to be noted that the assembly of the planetary gear and the motor-gear assembly may be simplified because of the proposed design of the planet carrier. In particular, helical wheel planetary gears, in which the planet wheel axle extends skewed to the planet carrier axis, may be manufactured in a simple manner.

A further embodiment is distinguished in that the inner helical wheel is connected in a rotationally-fixed manner to the electric motor. In general, it is simpler to fasten the inner helical wheel in a rotationally-fixed manner on the electric motor than to connect the inner helical wheel to the electric motor so it is axially fixed, but is rotatable. Moreover, the motor-gear assembly does not have any rotatable parts on the outside, since the inner helical wheel encloses the rotating planet carrier, whereby the safety in operation of the motor-gear assembly may be enhanced.

Moreover, the present disclosure relates to the use of a proposed planet carrier in adjustment units in vehicles for adjusting two vehicle parts adjustable in relation to one another.

BRIEF DESCRIPTION OF THE DRAWINGS

Exemplary embodiments of the present application will be explained in greater detail hereafter with reference to the appended drawings. In the figures.

DETAILED DESCRIPTION

Figure 1A:
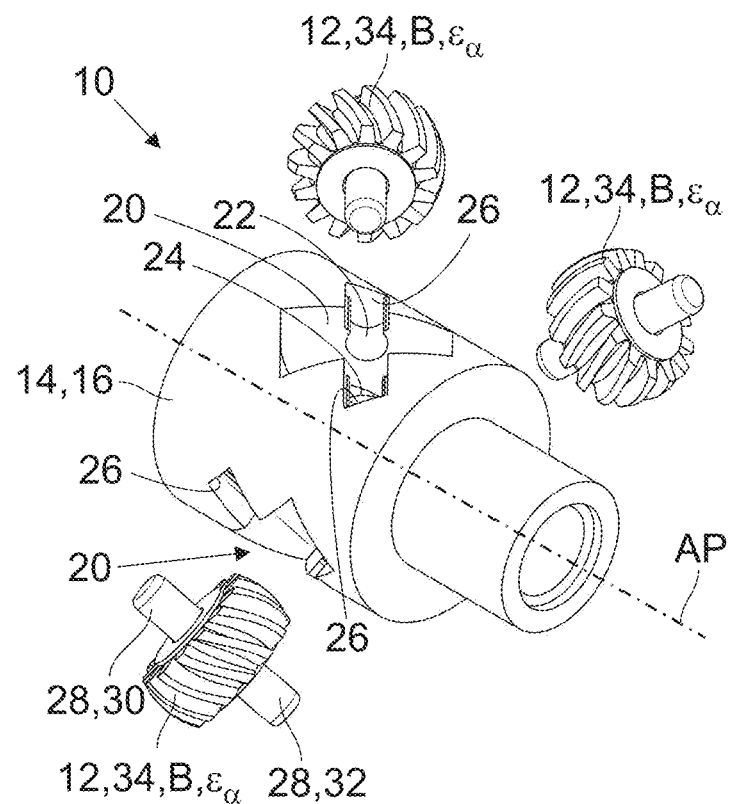
FIG. 1a) shows a perspective illustration of an exemplary embodiment of a proposed planet carrier having three planet wheels in the non-assembled state, FIG. 1b) shows the planet carrier shown in FIG. 1a) in the assembled state.
Figure 1B:
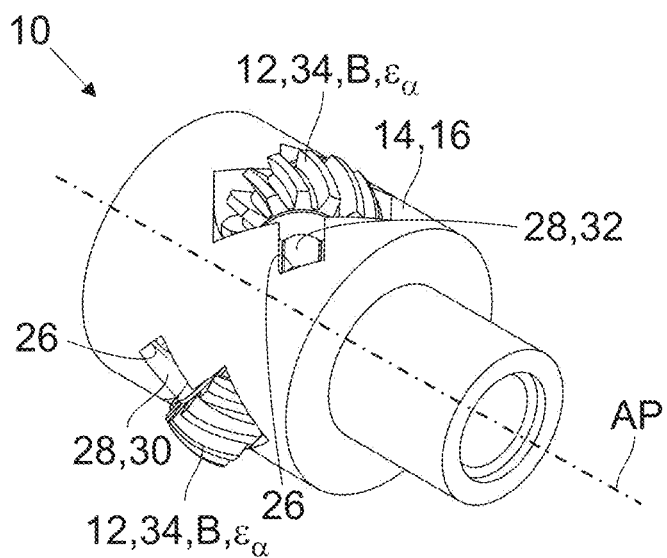

FIG. 1a) shows a perspective illustration of an exemplary embodiment of a proposed planet carrier 10 having three planet wheels 12 in the non-assembled state. FIG. 1b) shows the planet carrier 10 shown in FIG. 1b) in the assembled state.

The planet carrier 10 comprises a tubular main body 14 having an outer surface 16. The tubular main body 14 encloses an interior 18, which can be seen best in FIG. 4. Moreover, the main body 14 defines a planet carrier axis AP.

The tubular main body 14 has three passages 20, which penetrate the main body 14 from the outer surface 16 toward the interior 18. In addition, one first support portion 22 and one second support portion 24, which each originate from the passage 20 and from the outer surface 16, are arranged per passage 20 in the main body 14. The support portions 22, 24 therefore lead into the passage 20 and are open toward the outer surface 16. The support portions 22, 24 only partially penetrate the main body 14 and therefore do not establish a connection to the interior 18. The support portions 22, 24 therefore each have a shell-shaped base 25 (see FIGS. 2 and 3). Furthermore, the support portions 22, 24 each have a delimiting surface 26.

The three planet wheels 12 each comprise a planet wheel axle 28, which has a first axle portion 30 and a second axle portion 32, each of which protrudes beyond the planet wheel 12. The planet wheels 12 are each provided with planet wheel gear teeth 34, which have a crowning B and a profile overlap Ea.

For assembling the planet carrier 10, the planet wheels 12 are provided with the planet wheel axle 28. The planet wheel axle 28 can be manufactured from metal, for example, onto which the planet wheel 12 is pressed. Alternatively, the planet wheel 12 and the planet wheel axle 28 can be embodied in one piece, for which purpose manufacturing the planet wheel axle 28 and the planet wheel 12 from plastic suggests itself.

The planet wheels 12 provided with the planet wheel axle 28 are subsequently inserted into the passage 20 and the two support portions 22, 24 until the planet wheel axle 28 rests on the base 25 of the support portions 22, 24. As can be seen from FIGS. 1a) and 1b), in this case the planet wheel 12 protrudes radially outward out of the passage 20 beyond the outer surface 16 of the planet carrier 10. It is recognizable from FIG. 4 that the planet wheel 12 protrudes into the interior 18.

The passage 20 and the support portions 22, 24 are arranged such that the planet wheel axles 28 extend skewed to the planet carrier axis AP when the axle portions 30, 32 are accommodated in the support portions 22, 24. The axial mobility of the planet wheel 12 is delimited by the delimiting surfaces 26. When reference is made to an axial mobility of the planet wheels 12, this relates to a movement along an axis of rotation defined by the planet wheel axles 28 and the support portions 22, 24, about which the planet wheels 12 can rotate in the planet carrier 10.

The delimiting surface 26 terminates the support portions 22, 24 axially and therefore the material volume of the main body 14 occupied for the provision of the support portions 22, 24 is kept small. The torsional rigidity of the main body 14 is enhanced in contrast to the support portions 22, 24, which would run out into the main body 14 without the end wall 26.

The planet wheel axles 28 are dimensioned such that they permit a certain axial mobility of the planet wheels 12. However, the axial mobility is selected such that the planet wheels 12 cannot bear against the main body 14 in the passage 20. The ability of the planet wheels 12 to rotate is ensured in this way.

Figure 2:
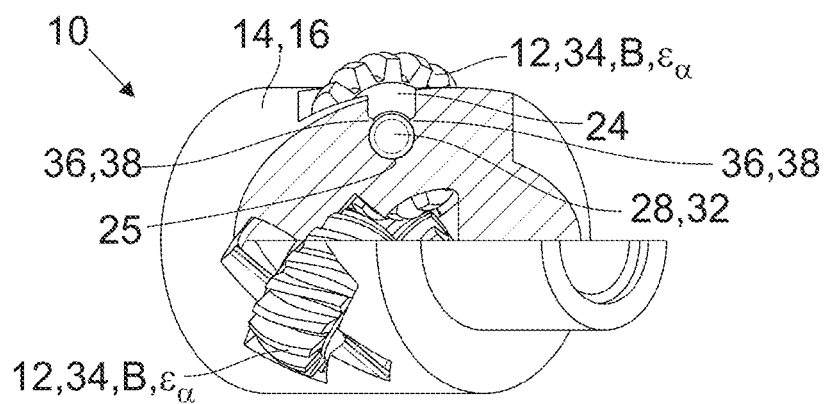
FIG. 2 shows the assembled planet carrier shown in FIG. 1b) on the basis of an illustration in partial section.
Figure 3:
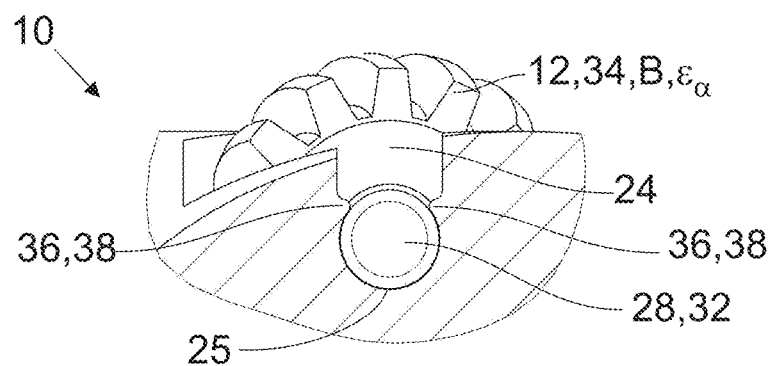
FIG. 3 shows an enlarged illustration of a region of the part of FIG. 2 in section.

The assembled planet carrier 10 is shown on the basis of illustrations in partial section in FIGS. 2 and 3. In particular, it is recognizable from FIG. 3 that the planet carrier 10 has fixing means 36, using which the axle portions 30, 32 of the planet wheel axles 28 can be fixed in the support portions 22, 24. In the illustrated exemplary embodiment, the fixing means 36 are designed as elastic projections 38, which are formed by the main body 14 and protrude into the support portions 22, 24. During the insertion of the axle portions 30, 32 into the support portions 22, 24, the projections 38 are briefly deformed. When the axle portions 30, 32 rest on the base 25 of the support portions 22, 24, the projections 38 returned back into their original shape and form an undercut, and therefore the axle portions 30, 32 are fixed in an interlocked manner in the support portions 22, 24. The axle portions 30, 32 can thus be clipped into the support portions 22, 24. Moreover, the undercut enhances the load bearing component of the support portions 22, 24, whereby the support of the axle portions 30, 32 is enhanced.

Figure 4:
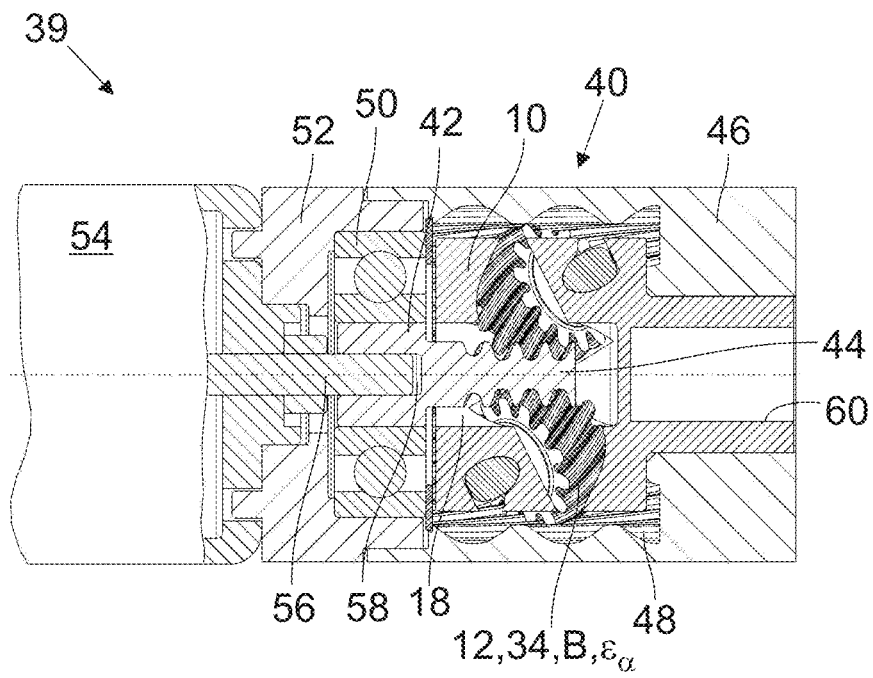
FIG. 4 shows an illustration in partial section of a motor-gear assembly having the planet carrier shown in FIGS. 1a) to 3.

In FIG. 4, a motor-gear assembly 39 is shown on the basis of an illustration in partial section, which comprises a helical wheel planetary gear 40 having the planet carrier 10 shown in FIGS. 1 to 3. Moreover, the helical wheel planetary gear 40 comprises a helical wheel shaft 42, which has helical wheel gear teeth 44, which are engaged with the planet wheel gear teeth 34. Furthermore, the helical wheel planetary gear 40 comprises an inner helical wheel 46 having inner gear teeth 48, which engage in the planet wheel gear teeth 34. The helical wheel shaft 42 is axially and radially installed using a ball bearing 50, wherein the ball bearing 50 is arranged in a bearing receptacle 52.

Furthermore, the motor-gear assembly 39 comprises an electric motor 54 having a motor shaft 56, which protrudes out of the electric motor 54. The helical wheel shaft 42 forms a motor shaft receptacle 58, in which the motor shaft 56 engages in a rotationally-fixed manner. The bearing receptacle 52 is fastened in a rotationally-fixed manner on the electric motor 54. Moreover, the inner helical wheel 46 is connected in a rotationally-fixed manner to the bearing receptacle 52. Because the inner helical wheel 46 is fastened in a rotationally-fixed manner on the bearing receptacle 52 and indirectly fastened in a rotationally-fixed manner on the electric motor 54, the rotation of the motor shaft 56 is converted into a rotation of the planet carrier 10. The planet carrier 10 has a driver 60, to which an output shaft (not shown) can be connected in a rotationally-fixed manner.

LIST OF REFERENCE SIGNS 10 planet carrier
12 planet wheel
14 main body
16 outer surface
18 interior
20 passage
22 first support portion
24 second support portion
25 base
26 delimiting surface
28 planet wheel axle
30 first axle portion
32 second axle portion
34 planet wheel gear teeth
36 fixing means
38 projection
39 motor-gear assembly
40 helical wheel planetary gear
42 helical wheel shaft
44 helical wheel gear teeth
46 inner helical wheel
48 inner gear teeth
50 ball bearing
52 bearing receptacle
54 electric motor
56 motor shaft
58 motor shaft receptacle
60 driver
AP planet carrier axis
B crowning
$\varepsilon_\alpha$ profile overlap

What is claimed:

1. A planet carrier for supporting a planet wheel in a planetary gear for an adjustment unit for adjusting two components adjustable in relation to one another, comprising:
    the planet wheel comprising:
        a planet wheel axle with a first axle portion protruding beyond the planet wheel and a second axle portion protruding beyond the planet wheel,
    the planet carrier comprising:
        a tubular main body having an outer surface,
        a passage arranged in the tubular main body and which penetrates the tubular main body,
        a first support portion that originates from the passage and the outer surface, and
        a second support portion that originates from the passage and the outer surface,
        wherein the first and the second support portions are arranged for the rotatable accommodation of the first and the second axle portions of the planet wheel axle, and elastic projections that fix the first and the second axle portions in the support portions.

2. The planet carrier as claimed in claim 1, wherein the elastic projections are elastically deformable projections formed by the main body,
    wherein the axle portions are clipped into the support portions.

3. The planet carrier as claimed in claim 1, wherein the elastic projections are plastically deformed projections formed by the main body.

4. The planet carrier as claimed in claim 1, wherein the support portions each have a delimiting surface for delimiting the axial mobility of the planet wheel.

5. The planet carrier as claimed in claim 1, wherein the tubular main body defines a planet carrier axis and the support portions are arranged such that the planet wheel axle extends skewed to the planet carrier axis when the axle portions are accommodated in the support portions.

6. The planet carrier as claimed in claim 1, wherein the planet wheel has planet wheel gear teeth having a crowning.

7. The planet carrier as claimed in claim 1, wherein the planet wheel has planet wheel gear teeth having a profile overlap.

8. The planet carrier as claimed in claim 1, wherein the planet carrier comprises plastic.

9. The planet carrier as claimed in claim 8, wherein the planet carrier is injection-molded.

10. A helical wheel planetary gear for an adjustment unit for adjusting two components adjustable in relation to one another, comprising:
- a planet carrier that defines a planet carrier axis, the planet carrier comprising:
  - a tubular main body having an outer surface,
  - a passage arranged in the tubular main body and which penetrates the tubular main body,
  - a first support portion that originates from the passage and the outer surface, and
  - a second support portion that originates from the passage and the outer surface,
  - wherein the first and the second support portions are arranged for the rotatable accommodation of a first and a second axle portions of the planet wheel axle, and
- elastic projections that fix the first and the second axle portions in the support portions;
- a planet wheel with planet wheel gear teeth, is the planet wheel is installed in the planet carrier such that the planet wheel is rotatable about a planet wheel axle, wherein the planet wheel axle extends skewed to the planet carrier axis,
- a helical wheel shaft with helical gear teeth, the helical wheel shaft is installed such that the helical wheel shaft is rotatable about the planet carrier axis, wherein helical wheel gear teeth engage with planet wheel gear teeth, and
- an inner helical wheel having inner gear teeth, which are engaged with the planet wheel gear teeth.

11. A motor-gear assembly for an adjustment unit for adjusting two components adjustable in relation to one another, comprising:
- an electric motor and
- a helical wheel planetary gear comprising:
  - a planet carrier that defines a planet carrier axis, the planet carrier comprising:
  - a tubular main body having an outer surface,
  - a passage arranged in the tubular main body and which penetrates the tubular main body,
  - a first support portion that originates from the passage and the outer surface, and
  - a second support portion that originates from the passage and the outer surface,
  - wherein the first and the second support portions are arranged for the rotatable accommodation of a first and a second axle portions of the planet wheel axle, and
- elastic projections that fix the first and the second axle portions in the support portions;
- a planet wheel with planet wheel gear teeth, is the planet wheel is installed in the planet carrier such that the planet wheel is rotatable about a planet wheel axle, wherein the planet wheel axle extends skewed to the planet carrier axis,
- a helical wheel shaft with helical gear teeth, the helical wheel shaft is installed such that the helical wheel shaft is rotatable about the planet carrier axis, wherein the helical wheel gear teeth engage with the planet wheel gear teeth, and
- an inner helical wheel having inner gear teeth, which are engaged with the planet wheel gear teeth,
- wherein the electric motor has a motor shaft, which is connected in a rotationally-fixed manner to the helical wheel shaft.

12. The motor-gear assembly as claimed in claim 11, wherein the inner helical wheel is connected in a rotationally-fixed manner to the electric motor.

* * * * *